United States Patent
Davis

(10) Patent No.: US 9,894,351 B2
(45) Date of Patent: Feb. 13, 2018

(54) ASSESSING PACKET LOSS VISIBILITY IN VIDEO

(71) Applicant: BRITISH TELECOMMUNICATIONS PUBLIC LIMITED COMPANY, London (GB)

(72) Inventor: Andrew Gordon Davis, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 220 days.

(21) Appl. No.: 14/369,748

(22) PCT Filed: Dec. 18, 2012

(86) PCT No.: PCT/GB2012/000914
§ 371 (c)(1),
(2) Date: Jun. 30, 2014

(87) PCT Pub. No.: WO2013/098539
PCT Pub. Date: Jul. 4, 2013

(65) Prior Publication Data
US 2014/0347562 A1    Nov. 27, 2014

(30) Foreign Application Priority Data
Dec. 30, 2011  (EP) .................................. 11250951

(51) Int. Cl.
H04N 17/00 (2006.01)
G06T 7/00 (2017.01)

(52) U.S. Cl.
CPC ......... *H04N 17/004* (2013.01); *G06T 7/0002* (2013.01); *G06T 2207/10016* (2013.01);
(Continued)

(58) Field of Classification Search
CPC .................................................... G06T 7/0002
(Continued)

(56) References Cited

U.S. PATENT DOCUMENTS

2005/0138532 A1* 6/2005 Park .................. H04N 19/51
714/776
2006/0013320 A1   1/2006 Oguz et al.
(Continued)

FOREIGN PATENT DOCUMENTS

EP          2 229 002          9/2010

OTHER PUBLICATIONS

International Search Report for PCT/GB2012/000914, dated Mar. 12, 2013.
(Continued)

*Primary Examiner* — Jorge L Ortiz Criado
*Assistant Examiner* — Mainul Hasan
(74) *Attorney, Agent, or Firm* — Nixon & Vanderhye P.C.

(57) ABSTRACT

The invention presents a new NR-H method for assessment of packet loss visibility measure for a video sequence, where the measure is indicative of the effect on the perceptual quality of the video. Packet loss can occur as a result of the video being transmitted over an imperfect network. The invention combines dynamic modelling of temporal and spatial properties of the decoded pictures with bitstream information revealing location, extent and propagation of any errors. Analysis is performed on blocks of pixels, and preferably the macroblocks defined in the particular video encoding scheme. Knowledge of the error extent from the bitstream information is used to target spatial analysis around the specific error locations. Perceptual impact is estimated by utilizing spatio-temporal modelling to predict the properties of a missing block, and comparing those predictions with the actual properties of the missing block.

9 Claims, 6 Drawing Sheets

(52) U.S. Cl.
CPC ............... *G06T 2207/20021* (2013.01); *G06T 2207/30168* (2013.01)

(58) Field of Classification Search
USPC ......................................................... 348/720
See application file for complete search history.

(56) References Cited

U.S. PATENT DOCUMENTS

| | | | | |
|---|---|---|---|---|
| 2009/0003461 | A1* | 1/2009 | Kwon ................. | H04N 19/176 375/240.27 |
| 2011/0249127 | A1 | 10/2011 | Zhang et al. | |
| 2012/0008673 | A1* | 1/2012 | Suresh ................. | H04N 19/154 375/240.01 |

OTHER PUBLICATIONS

Author unknown: "Final report from the Video Quality Experts Group on the Validation of Objective Models of Video Quality Assessment", Phase 2, Jun. 2000, (125 pages), http://www.vqeg.org/.

Author unknown: "Objective Perceptual Video Quality Measurement Techniques for Digital Cable Television in the Presence of a Full Reference," ITU-T, J.144, 2003 (156 pages).

A. G. Davis, D. Bayart, and D. S. Hands, "Hybrid No-Reference Video Quality Prediction", IEEE International Symposium on Broadband Multimedia Systems and Broadcasting, May 13-15, 2009, Bilbao, Spain (6 pages).

B. Girod, "What's Wrong with Mean-Squared Error," in Digital Images and Human Vision, A. B. Watson, Ed. Cambridge, MA: MIT Press, 1993, pp. 207-220 (14 pages).

Z. Wang et al., "Image Quality Assessment: From Error Visibility to Structural Similarity", IEEE Trans. Im. Proc., vol. 13, Apr. 2004 (14 pages).

J. L. Mannos and D. J. Sakrison, "The Effects of a Visual Fidelity Criterion on the Encoding of Images," IEEE Transactions on Information Theory, vol. IT-20, No. 4, pp. 525-536 (12 pages), Jul. 1974.

Z. Wang, A. C. Bovik, and L. Lu, "Why is Image Quality Assessment So Difficult," in Proc. IEEE Int. Conf. Acoustics, Speech, and Signal Processing, vol. 4, Orlando, FL, May 2002, pp. 3313-3316 (4 pages).

H. Rui, C. Li, S. Qiu and J. Chen, "Fast Evaluation of Packet Loss Impairment on MPEG-2 Streaming Video Using Fisher Classifier," Proc. ICSP-2006 (4 pages).

A. R. Reibman and D. Poole, Characterizing Packet Loss Impairments in Compressed Video., IEEE Int. Conf. Image Proc., Sep. 2007 (4 pages).

A. R. Reibman, S. Kanumuri, V. Vaishampayan, and P. C. Cosman, "Visibility of Individual Packet Losses in MPEG-2 Video," in Proc. IEEE ICIP, Oct. 2004, (5 pages).

S. Kanumuri P. Cosman, A. Reibman and V. Vaishampayan, "Modeling Packet-Loss Visibility in MPEG-2 Video", IEEE Transactions on Multimedia, vol. 8, No. 2, Apr. 2006 (15 pages).

N. Staelens et al, "VIQID: A No-Reference Bit Stream-Based Visual Quality Impairment Detector," IEEE 2010, (6 pages).

J. Shin and P. Cosman, "Classification of MPEG-2 Transport Stream Packet Loss Visibility," Mar. 2010, Dept. of Electrical and Computer Engineering, University of California, San Diego (5 pages).

N. Suresh and N. Jayant, "Mean Time Between Failures: A Functional Quality Metric for Consumer Video," First International Workshop on Video Processing and Quality Metrics for Consumer Electronics, Jan. 2005 (4 pages).

Zheng, Yang and Liu, "Blockiness Evaluation for Reducing Blocking Artifacts in Compressed Images", IEEE 2009 (2 pages).

Pechard et al "A New Methodology to Estimate the Impact of H.264 Artefacts on Subjective video Quality", Apr. 2008 (7 pages).

R. Babu, A. Bopardikar, A. Perkis and O. Hillestad "No-Reference Metrics for Video Streaming Applications" Centre for Quantifiable Quality of Service in Communication Systems 2004, (9 pages).

\* cited by examiner

ASSESSING PACKET LOSS VISIBILITY IN VIDEO

This application is the U.S. national phase of International Application No. PCT/GB2012/000914 filed 18 Dec. 2012 which designated the U.S. and claims priority to EP Patent Application No. 11250951.8 filed 30 Dec. 2011, the entire contents of each of which are hereby incorporated by reference.

FIELD OF THE INVENTION

This invention relates to the assessment of packet loss visibility in a video sequence, in particular to determining a measure of error visibility using dynamic temporal and spatial modelling of the video sequence to determine expected measures for blocks in the sequence affected by packet loss, and comparing the expected measures to the actual measures associated with the blocks.

BACKGROUND TO THE INVENTION

The increasing importance of live video services streamed over the internet has highlighted the need for methods that can accurately assess the quality of the video experienced by the end user. Network characteristics can have a significant impact on the video quality, such as packet loss, latency, and other effects of the network. Accurate quality assessment is essential in the design, provisioning and testing of video transmission systems. Sensible balancing of factors such as video resolution, encoder profile, encoded bit rate, latency, and error detection as well as error correction/recovery all depend on the understanding of the end-user experience and particularly the perceived video quality.

For services unable to utilise retransmission to mitigate the effects of network losses, packet loss impairment (PLI) can have a major impact on the perceived video quality experienced by the end-user. An example of such is an IP based broadcast video system, where video can only be sent once, and any packets lost during transmission have, to be dealt with without the benefit of retransmission.

Techniques used for PLI assessment are categorized as follows: a) full-reference (FR), where source and degraded video sequences are analysed; b) picture buffer no-reference (NR-P), where only the decoded picture is analysed; c) bitstream no-reference (NR-B), where only the bitstream prior to decoding is analysed; and d) hybrid no-reference (NR-H), where both the bitstream and decoded picture information is analysed. FR measures of mean squared error (MSE) and peak signal to noise ratio (PSNR) are popular for their convenient and tractable nature. Unfortunately, these measures have limited accuracy as indicators of perceived video quality. Improvements to these measures may be achieved through perceptually weighting the error signal according to expected visibility, where weighting factors are determined by subjective tests. FR structural similarity (SSIM) based image quality assessment techniques compare the structures (information and properties from the visual scene) of the reference and distorted signals. SSIM uses measures of change in structural information as an approximation to perceived image distortion.

The perceptual impact of PLI depends on factors such as position, size and duration of the error in the video, the sophistication of the recovery technique and the masking properties of the video. FR measures, such as SSIM and MSE, can be used to assess PLI effects on decoded video, but generally do not directly consider these PLI factors.

NR-P techniques tailored for PLI evaluation, such as slice boundary mismatch (SBM), attempt to measure PLI factors through modelling effects such as discontinuities in pixel rows. However, NR-P techniques suffer from not knowing the exact location of errors and having to rely on statistical models to discriminate between errored and unerrored portions of the picture. This can lead to inaccuracy due to misclassification of natural image variation as a possible error.

NR-H models typically use the errored bitstream to measure the error extent and have access to macroblock type and motion information to predict the limits of propagation of these errors. This error specific information may be used to enhance accuracy of FR and NR-P techniques.

SUMMARY OF THE INVENTION

It is the aim of embodiments of the present invention to provide an improved method of assessing the impact of packet loss in a video sequence.

According to one aspect of the present invention, there is provided a method of determining error visibility resulting from packet loss in a video sequence, said video sequence comprising a plurality of frames, each frame comprising a plurality of blocks, said method comprising:
(i) identifying a block affected by packet loss in one of the plurality of frames, wherein the frame containing the identified block is the current frame;
(ii) determining an expected temporal measure associated with the identified block based on a temporal difference of the area associated with the identified block across a plurality of the preceding frames;
(iii) determining an expected spatial measure associated with the identified block based on a spatial difference between the identified block and one or more blocks neighbouring the identified block, the spatial difference considered over a plurality of preceding frames;
(iv) comparing the determined expected temporal measure with the actual temporal measure for the identified block, wherein the actual temporal measure is based on a temporal difference of the area associated with the identified block in the current and at least one preceding frame;
(v) comparing the determined expected spatial measure with the actual spatial measure for the identified block, wherein the actual spatial, measure is based on a spatial difference between the identified block and one or more blocks neighbouring the identified block in the current frame;
(vi) determining a measure of error visibility of the identified block based on the said comparisons.

The comparing step (iv) may further comprise setting one or more temporal thresholds based on the determined expected temporal measure, wherein the one or more temporal threshold is used in the comparison with the actual temporal measure.

The comparing step (v) may further comprise setting one or more spatial thresholds based on the determined expected spatial measure, wherein the one or more spatial threshold is used in the comparison with the actual spatial measure.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

The invention presents a new NR-H method for assessment of packet loss visibility measure for a video sequence, where the measure is indicative of the effect on the perceptual quality of the video. Packet loss can occur as a result of the video being transmitted over an imperfect network. The invention combines dynamic modelling of temporal and spatial properties of the decoded pictures with bitstream information revealing location, extent and propagation of any errors. Analysis is performed on blocks of pixels, and preferably the macroblocks defined in the particular video encoding scheme. Knowledge of the error extent from the bitstream information is used to target spatial analysis around the specific error locations. Perceptual impact is estimated by utilising spatio-temporal modelling to predict the properties of a missing block, and comparing those predictions with the actual properties of the missing block. Masking effects resulting from neighbouring blocks are taken into consideration, and used to adapt decision thresholds.

Figure 1:
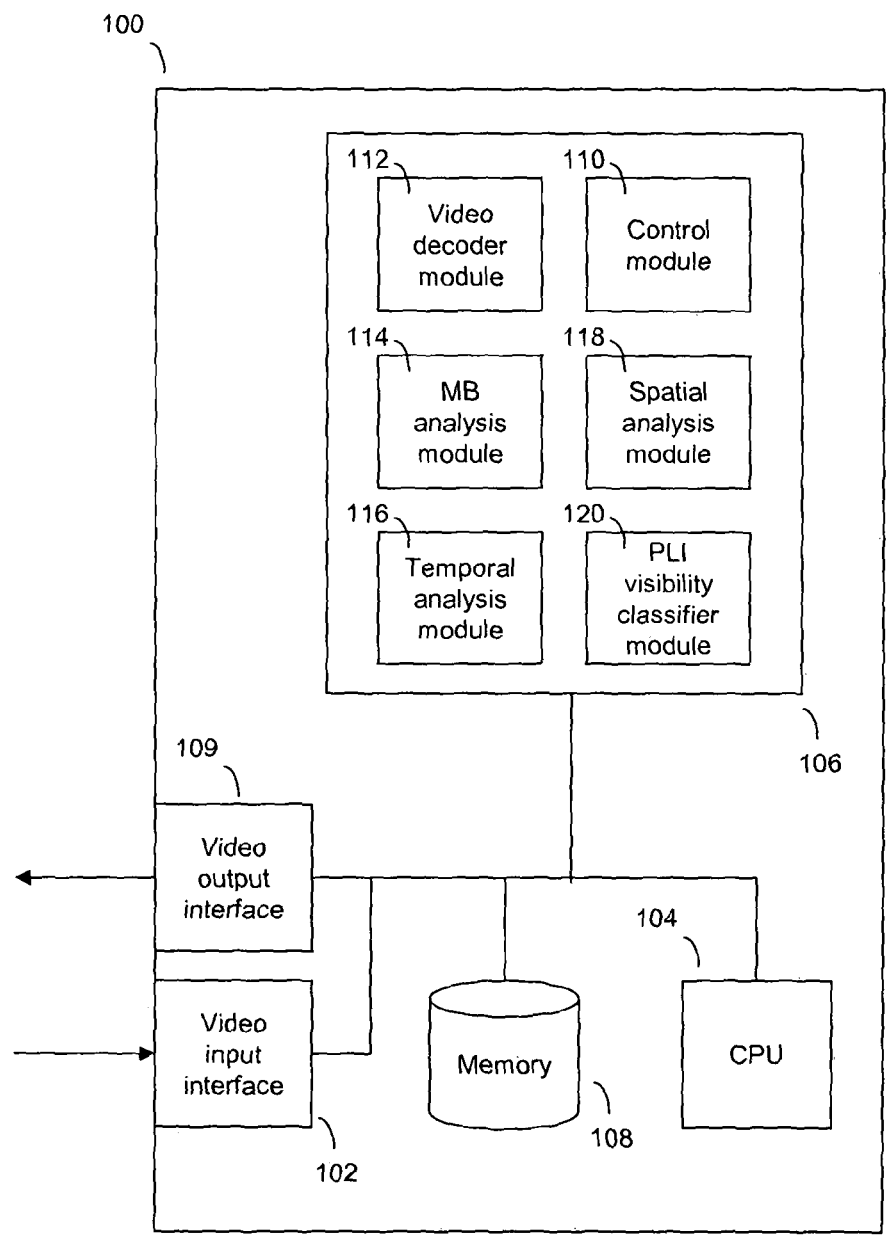
FIG. 1 shows a receiver for error visibility assessment in an example of the present invention.

FIG. 1 illustrates an example of a receiver 100. The receiver 100 may be part of a PC or set top box (STB) for example. The receiver 100 is capable of receiving encoded video and processing the video as will be described below.

Specifically, the receiver 100 comprises a video input interface 102 that receives encoded video signals. The video signals may be received over a network such as the internet. The network may cause losses in data being transmitted, such as dropped packets, and any received video signals may include some data loss.

A processor 104 operates under control of program modules stored in local storage 106, for example a hard disk, and also has access to storage 108, for example RAM. The video input interface 102 includes a buffer to store received encoded video until the encoded video is ready for decoding by the processor 104.

Received video may also be stored at the receiver 100 in the storage 108, for later decoding and analysis, or simply for playback.

The receiver also includes a video output interface 109, which can output video signals to a suitable output device such as a monitor or television.

The program modules include a general purpose operating system (not shown) and various other software modules used for video decoding and analysis. The software modules comprise:

a control module 110;
a video decoder module 112: in this example the decoding software implements a decoding algorithm compliant with the ITU H.264 standard;
a macroblock analysis module 114;
a temporal analysis module 116;
a spatial analysis module 118
a PLI visibility classification module 120.

The control module 110, when run by the processor 104, serves to control the overall operation of the receiver. The other software modules are also be run by the processor 104 and provide functions relating to the invention that will be described below.

Figure 2:
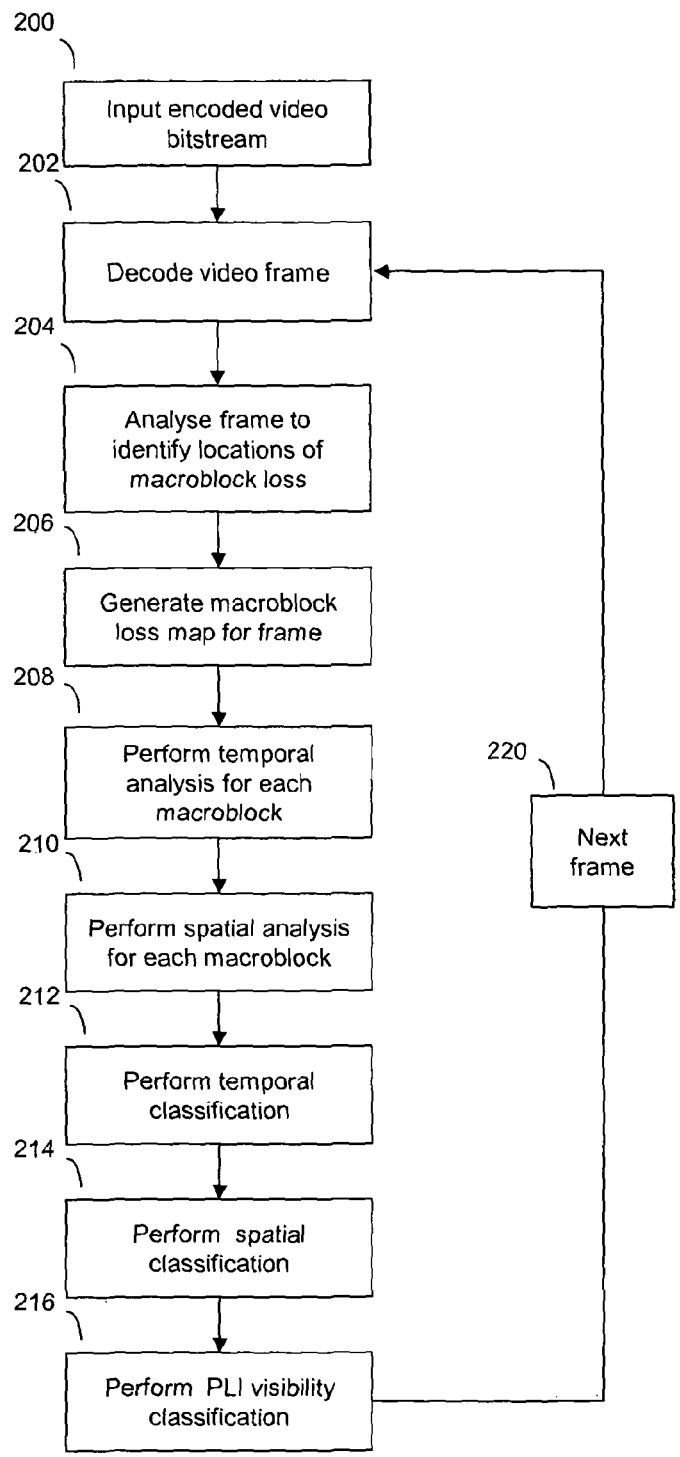
FIG. 2 is a flowchart illustrating the steps of an example of the present invention.
Figure 3:
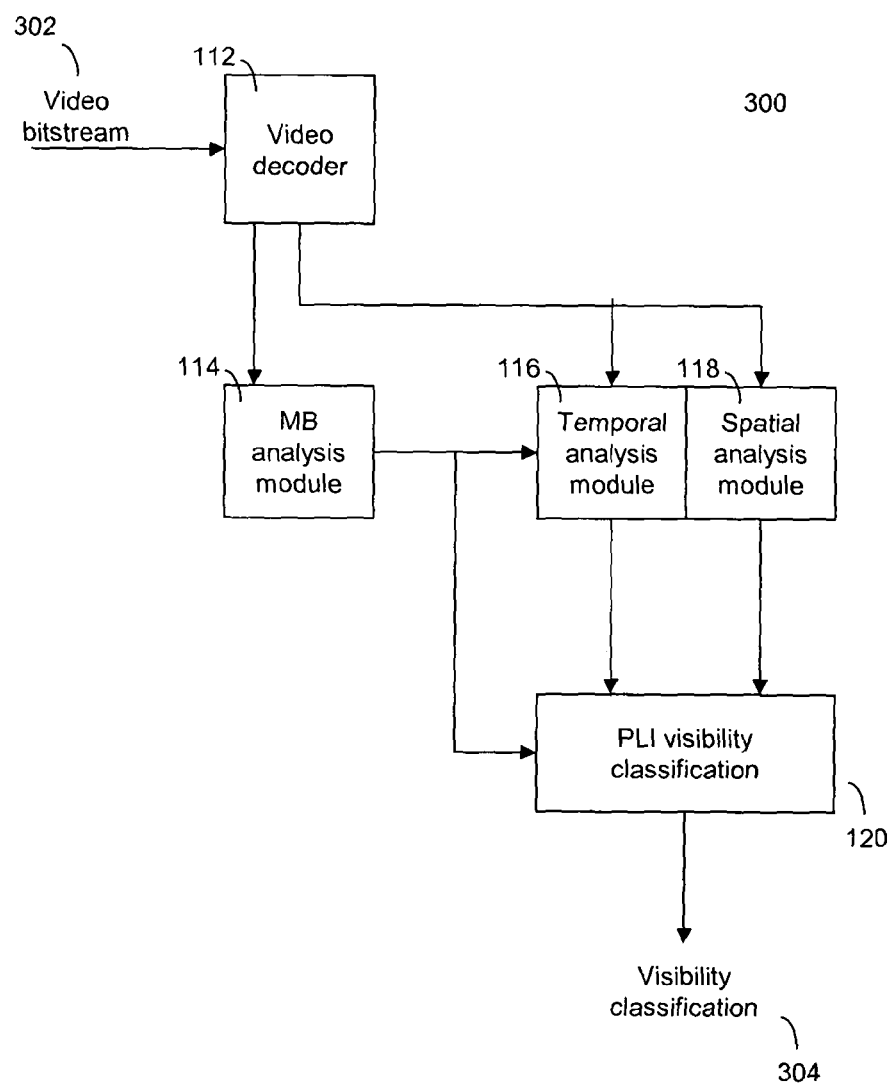
FIG. 3 is a process flow chart showing the flow of data between the functional modules in an example of the present invention.

FIG. 2 is a flow chart summarising the general method for assessing packet loss impairment in an example of the present invention. FIG. 3 shows a schematic block diagram, where the various software modules from system diagram in FIG. 1 are illustrated and shows the processing flows between them, with references to like elements made with like reference numerals.

In step 200, an encoded video sequence is input into the receiver 100 under the control of the control module 110. The encoded video may be input via the video input interface 102, or alternatively may have been received previously and is now taken from the memory 108. In this example, the video sequence is assumed to be encoded in accordance with the ITU-T H.264 video coding standard, though it will be appreciated that the invention can be used with video encoding with other standards.

The encoded video sequence comprises a series of frames, and in step 202, the first frame of video sequence is decoded by the video decoding module 112. The decoded picture is stored in memory 108.

The encoded video sequence is subject to packet loss as a result of transmission loss over the network. The relationship between the units of data loss (packets) that result from channel impairments and the underlying encoded data structure (slices) is very important to the nature of the degradation in the decoded video. A slice is a block of data representing a whole number of encoded macroblocks, and importantly contains a header that indicates the spatial location of those macroblocks. A slice can be decoded independently from others within a frame and therefore offers inherent error robustness by the fact that its loss will not affect other slices within a frame. The use of small encoder slice sizes, aligned to the transmission units such as 1 slice per packet, minimizes spatial propagation of visible artefacts and maximizes the benefits of complex macroblock recovery techniques available in the decoder. Conversely, the use of large slice sizes, such as one per picture, can allow small units of data loss to propagate through subsequent macroblocks.

Here, we consider a single encoded slice per packet. In this case, the loss of the data will not affect other slices within the same picture, so that any effects will be limited to the spatial area represented by the slice. Also, the loss of the data can be detected at the end of picture decoding by searching for macroblocks that have not been updated and a loss map generated. Although there exist highly efficient macroblock recovery techniques, such as motion-compensated error concealment (MCEC), that are able to minimize the visibility of resulting artefacts, many different levels of recovery will be available between decoder implementations. It is therefore important that the properties of the recovered blocks are assessed for an accurate estimate of artefact visibility to be made.

In step 204, the encoded bitstream is analysed to determine the precise locations of missing parts of the frame as described above. In practice, this analysis is performed as part of the decoding process.

In step 206, the macroblock analysis module 114 generates a macroblock loss map for the frame. The macroblock loss map comprises array of elements corresponding to the macroblocks of the frame. Each element contains a flag to indicate whether the corresponding macroblock has been lost or not. The macroblock loss map is stored in the memory 108 together with an indicator of the frame it is associated with.

The loss map L(n, m) for macroblock m of frame n is given as:

$$L(n,m)=\{0,1\} m\epsilon M(n) n\epsilon N \quad (1)$$

N defines a set of frames in a video sequence; and
M(n) defines the set of macroblocks within frame n.

There then follows temporal and spatial analysis of the decoded frame.

In step 208, temporal analysis is performed on each macroblock for the decoded frame (from step 202), and used to model the expected temporal variation of each macroblock within the frame. Step 208 is performed by the temporal analysis module 116. In practice, temporal analysis requires at least one earlier frame, so the analysis is not usually performed on the first frame. Nonetheless, the general method of analysis will be summarised here.

A temporal model is generated by looking at the temporal variation for each macroblock in the frame, which involves looking at variations in pixel properties, such as intensity, over time, which equates to a number of video frames. This results in an expected temporal variation for each macroblock in the given frame, with the model updated for each new frame. When a lost macroblock is detected, by looking at the macroblock loss map, the expected temporal variation is compared to the measured temporal variation for the identified lost macroblock to determine the visibility of the loss.

The expected temporal variation or measure can be represented as ET(n,m) for macroblock m in frame n. The specific method for determining the expected temporal measure will be described in detail later below. ET(n,m) for each macroblock in each frame is stored in memory 108.

In preferred examples, an area around the lost macroblock is considered, for example the macroblocks adjacent to the lost macroblock, rather than just the single lost macroblock. The variation of this area is then used to generate an expected temporal variation by considering the area over a number of earlier frames.

In step 210, spatial analysis is performed on each macroblock for the decoded frame (from step 202) to model the expected spatial variation of each macroblock within a frame. Step 210 is performed by the spatial analysis module.

A spatial model is generated by looking at the spatial variation for each macroblock in the frame, which involves looking at variations in pixel properties, such as intensity, between the given macroblock and some of its neighbouring macroblocks in the same frame. This results in an expected spatial variation for each macroblock in the given frame, with the model updated for each new frame. When a lost macroblock is detected, by looking at the macroblock loss map, the expected spatial variation for that lost macroblock is compared to the measured spatial variation for that macroblock. These measures are use to determine the visibility of the loss.

The expected spatial variation or measure can' be represented as ES(n,m) for macroblock m of frame n. The specific method for determining the expected spatial measure will be described in detail later below. ES(n,m) for each macroblock in each frame is stored in memory 108.

In step 212, temporal classification is performed by the temporal analysis module 116. Whilst the temporal analysis step 208 and temporal classification step 212 have been shown as two separate steps, it should be appreciated that the steps may be performed as a single step by the temporal analysis module.

Temporal, classification first involves using the macroblock loss map to identify the macroblocks that have suffered loss. These macroblocks are targeted for analysis by first measuring the actual temporal variation MT(n,m) for each lost macroblock. The expected temporal variation ET(n,m) for that same lost macroblock is retrieved from the store. The measured and expected temporal variations are then compared in a manner according to the invention that applies thresholds to the measured temporal variations, with the thresholds adapted dynamically according to the result of the modelled expected temporal variations. A temporal class for the macroblock is output as a result.

Figure 4:
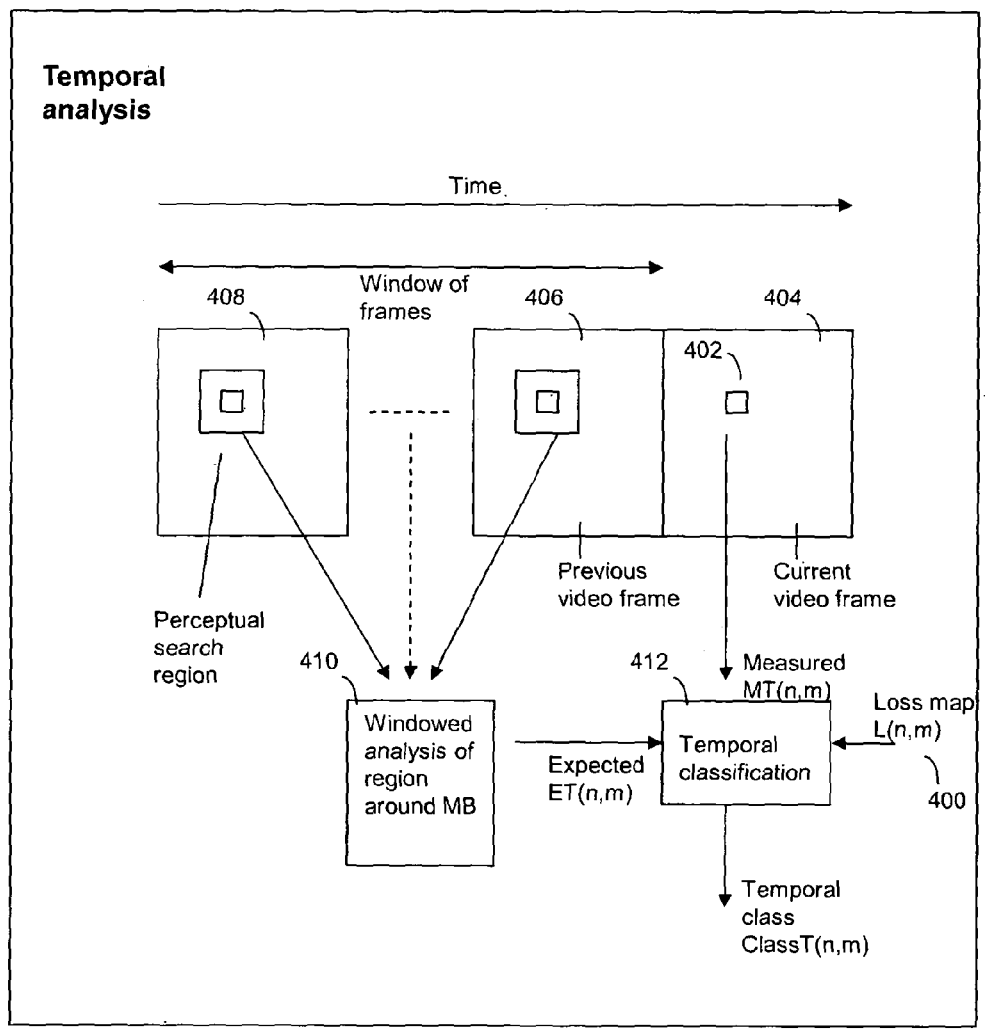
FIG. 4 is a schematic diagram illustrating temporal analysis and classification on a video sequence.

The temporal analysis process and temporal classification process are illustrated in FIG. 4. In FIG. 4, temporal analysis 410 is performed on each macroblock in each frame over a number, or window, of frames by the temporal analysis module 116. Expected temporal values ET(n,m) are generated. Using the macroblock loss map L(n,m) 400, lost macroblocks are identified. For each lost macroblock, the temporal variation for that macroblock is measured MT(n, m). In block 412, temporal classification is performed, by the temporal analysis module 116, using the measured temporal variation MT(n,m) for each lost macroblock and the expected temporal variation ET(n,m). The measured and expected temporal variations are used to generate a temporal class ClassT(n,m) for the lost macroblock. The temporal class ClassT(n,m) is stored in the memory 108 and used later in a further step of PLI visibility classification together with the generated spatial class ClassS(n,m).

In step 214, spatial classification is performed by the spatial analysis module 118. Like temporal classification, spatial classification may be performed in conjunction with the spatial analysis step by the spatial analysis module.

Spatial classification first involves using the macroblock loss map to identify the macroblocks that have suffered loss. These macroblocks are targeted for analysis by first measuring the actual spatial variation MS(n,m) for each lost macroblock. The expected spatial variation ES(n,m) for that same lost macroblock is retrieved from the store. The measured and expected Spatial variations are then compared in a manner according to the invention that applies thresholds to the measured spatial variations, with the thresholds adapted dynamically according to the result of the modelled expected spatial variations. A spatial class for the macroblock is output as a result.

Figure 5:
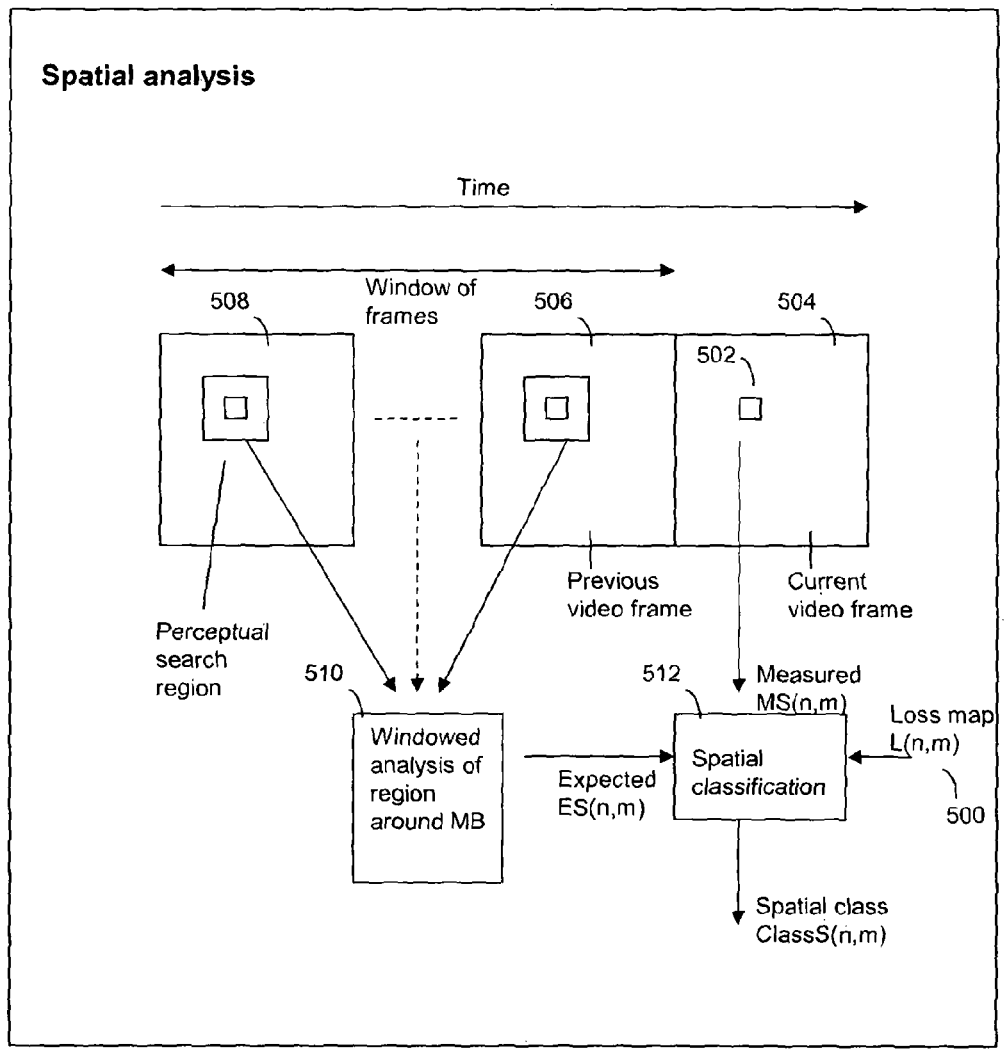
FIG. 5 is a schematic diagram illustrating spatial analysis and classification on a video sequence.

The spatial analysis process as well as the spatial classification process are illustrated in FIG. 5. In FIG. 5, spatial analysis 510 is performed on each macroblock in each frame by the spatial analysis module 118. Expected spatial values ES(n,m) are generated. Using the macroblock loss map L(n,m) 500, lost macroblocks are identified. For each lost macroblock, the spatial variation for that macroblock is measured MS(n,m). In block 512, spatial classification is performed, by the spatial analysis module 118, using the measured spatial variation MS(n,m) for each lost macroblock and the expected spatial variation ES(n,m). The measured and expected spatial variations are used to generate a spatial class ClassS(n,m) for the lost macroblock. The spatial class is stored in the memory 108 and used later in a further step of PLI visibility classification together with the generated temporal class ClassS(n,m).

In step 216, packet loss impairment classification may be performed by, for example, counting number of occurrences of when the measured temporal measure does not match with the expected temporal measure. This may be done by a direct comparison between the respective measures, but with some dynamic thresholding applied. This is discussed in more detail in the detailed description below. Similarly, a similar count can be taken for the spatial analysis.

The temporal and spatial counts may be simply combined, or further processing such as pooling analysis may be applied to determine some overall visual impact of the individual losses.

The specific manner in which the results are pooled are not critical to the general invention described here of dynamic modelling of the spatial and temporal measures within the video sequence to ascertain the effect of packet loss on a video sequence.

In step 220, the next frame in the video sequence is analysed, and steps 202 to 216 are repeated to determine a PLI visibility classification for any lost macroblocks in the next frame. The method is cycled through until all frames in the video sequence have been processed.

Detailed Description of Packet Loss Impairment Analysis

The description below sets out in detail the assessment of packet loss impairment in a preferred example.

Examples of the present invention utilise statistical modelling of temporal and spatial properties of the decoded picture together with knowledge of the location, propagation and extent of errors extracted from encoded bitstream.

Analysis is performed on blocks of pixels, and it is convenient to choose these blocks to match the macroblocks defined in the particular video encoding scheme. For H.264 main profile encoding, analysis is preferably performed on 16×16 pixel macroblocks.

Here, an NR-P approach to analysis of macroblocks is performed to build a model of properties that might reflect the presence of visible PLI. A general form of this analysis is given in equation (2) below, where the pixel property NRP(n,m) for macroblock m of frame n is calculated according to function $f_{NRP}$ operating on the set of pixels J(n,m) within the macroblock.

$$NRP(n,m) = f_{NRP}(J(n,m)) \; m \in M(n) \; n \in N \quad (2)$$

N defines the set of frames in a video sequence;
M(n) defines the set of macroblocks within frame n;
J(n,m) represents the set of pixels within macroblock m of frame n; and
$f_{NRP}()$ represents a function operating on the set of pixels within the analysis block.

Pixel luminance LAv and pixel variance LVar are two examples of functions operating on the set of pixels and are set out as:

$$LAv(J(n,m)) = \frac{1}{Jtot(J(n,m))} \sum_{j \in J(n,m)} lum(j) \quad m \in M(n) \; n \in N \quad (3)$$

$$LVar(J(n,m)) = \frac{1}{Jtot(J(n,m))} \sum_{j \in J(n,m)} (LAv(j(n,m)) - lum(j))^2 \quad (4)$$

$$m \in M(n) \; n \in N$$

lum(j) represents the luminance value of pixel j from set J(n,m).
Jtot(J(n,m)) equals the number of pixels within analysis block m of frame n.

To assess PLI visibility, both temporal analysis and spatial analysis using equation (2) are performed.

Temporal Analysis and Classification

Temporal analysis is used to model the expected temporal variation of the pixel properties for each macroblock in step 208. This is done by modelling the expected temporal variation of equation (2), with the aim of identifying unusual and visible, variations occurring at known packet loss error locations.

A temporal difference measure MT(n,m) for macroblock m of frame n may be defined according to (5).

$$MT(n,m) = NRP(n,m) - NRP(nprev,m) \; m \in M(n) \; n \in N \quad (5)$$

nprev identifies the frame that precedes the present frame h in time within the sequence set N.

Thus MT(n,m) represents a measure of temporal variation of a given macroblock. This measure may be used to estimate the visibility of lost or recovered macroblocks by comparing a measured value with an expected value calculated from previous frames. Analysis of the temporal difference measure MT(n,m) over preceding frames may be performed using equation (6) to determine an expected temporal measure ET(n,m)

$$ET(n,m) = f_{TWin}(MT(\,), WT(n,m)) \; m \in M(n) \; n \in N \quad (6)$$

where MT( ) is the temporal difference function to be applied to macroblocks defined by WT(n,m);
WT(n,m) defines a sliding window of macroblocks over which the expected temporal measure is to be calculated for a single macroblock m in frame n;
$f_{TWin}$ represents a function operating on the MT( ) values for the set of W(n,m) macroblocks.

An example of a linear (consecutive) 5-frame window of spatially co-located macroblocks by equation (7), where the macroblock under examination in each frame is fixed.

$$WT(n,m)\{(n-1,m),(n-2,m),(n-3,m),(n-4,m),(n-5,m)\} \quad (7)$$

Further, the average temporal difference measure $ET_{ave}$(n,m) over the window may be calculated according to equation (8).

$$ET_{ave}(n,m) = \frac{1}{nWT} \sum_{(nw,mw) \in WT(n,m)} MT(nw,mw) \quad m \in M(n) \; n \in N \quad (8)$$

nWT equals the number of macroblocks in the window WT( ).

Similarly, a maximum temporal difference measure over the window may be calculated according to equation (9).

$$ET_{max}(n,m) = \underset{(nw,mw) \in W(n,m)}{\text{Max}} (MT(nw,mw)) \quad m \in M(n) \; n \in N \quad (9)$$

The average and maximum temporal differences are thus calculated for each macroblock in each frame, and the results stored in memory 108.

The windowed temporal measure ET(n,m), which in this example is preferably $ET_{ave}$(n,m), represents an analysis of the variation of MT( ) in a spatio-temporal window preceding macroblock (n,m) and can be used to represent an expected value of MT(n,m). Thus, a number of macroblocks around macroblock m can be analysed in the temporal analysis instead of only m, hence spatio-temporal analysis. Analysis is performed for a number of frames (window) preceding the current frame. The visual impact of a lost macroblock may then be estimated by comparing the actual temporal difference measure, as measured over the current and a preceding frame as set out in equation (5), with the expected temporal difference measure according to equation (8).

In preferred examples, a classification method with thresholds adapted using the temporal model determines if the actual value of the macroblock is sufficiently "unusual" to be visible. The advantage of using expected values in this classification lies in the correlation of loss visibility with difference between measured and expected temporal values.

Equation (1) earlier describes a macroblock loss map. The visual impact of a lost or recovered macroblock can be estimated using the macroblock loss map defined by equation (1) to target analysis of the expected and measured temporal difference measures using equation (10) below.

$$ClassT(n,m)=fTclass(L(n,m),MT(n,m),ET(n,m)) m \in M(n) n \in N \quad (10)$$

In equation (10), fTclass( )=T0 for L(n,m)=0, where class T0 indicates a valid macroblock, not to be considered in packet loss visibility. Thus, the method preferably only performs classification for macroblocks that have suffered loss.

The temporal classification process analyses measured and expected temporal values of lost macroblocks to identify the presence of a large difference between the expected and measured values. This may be implemented on a per-macroblock basis in the form of a 2-threshold, 3-class technique according to equation (11).

$$ClassMT(n, m) = 0 \quad MT(n, m) < MT1(m, n) \quad (11)$$
$$= 1 \quad MT1(n, m) <= MT(n, m) < MT2(n, m)$$
$$= 2 \quad MT2(n, m) <= MT(n, m) \quad m \in M(n) \; n \in N$$

In equation (11), MT1(n,m) and MT2(n,m) are adaptive thresholds determined for each macroblock being analysed and are based on the corresponding expected temporal difference values for that macroblock. Class 0 is intended to represent a measured value MT(n,m) significantly lower than expected, class 1 within an expected range, and class 2 significantly higher than expected, with thresholds MT1(n, m) and MT2(n,m) are set accordingly.

Equations (12) and (13) below show a general form for determining the threshold values, where functions fT1( ) and fT2( ) may be weighted versions of functions such as average (see equation 7), maximum (see equation 8), minimum or a similar statistical function based on the windowed macroblocks.

$$MT1(n,m)=f_{T1}(MT(n,m),WT(n,m)) m \in M(n) n \in N \quad (12)$$

$$MT2(n,m)=f_{T2}(MT(n,m),WT(n,m)) m \in M(n) n \in N \quad (13)$$

The possible visible impact of the classification from (11) may be considered by also considering the magnitude of the expected measure ET( ) according to equation (14).

$$ClassET(n, m) = 0 \quad ET(n, m < ET1 \quad (14)$$
$$= 1 \quad ET1 <= ET(n, m) < ET2$$
$$= 2 \quad ET2 <= ET(n, m) \quad m \in M(n) \; n \in N$$

In equation (14), ET1 and ET2 are fixed thresholds. Class 0 is intended to represent an expected temporal value ET(n,m) for low temporal differences, class 2 for high temporal differences, and ET1 and ET2 are set accordingly.

Classification resulting from equations (11) and (14) may be combined into a dimensional class table according to equation (15) below.

$$ClassT(n,m)=ClassET(n,m)*3+ClassMT(n,m)+1 \quad (15)$$

Figure 6:
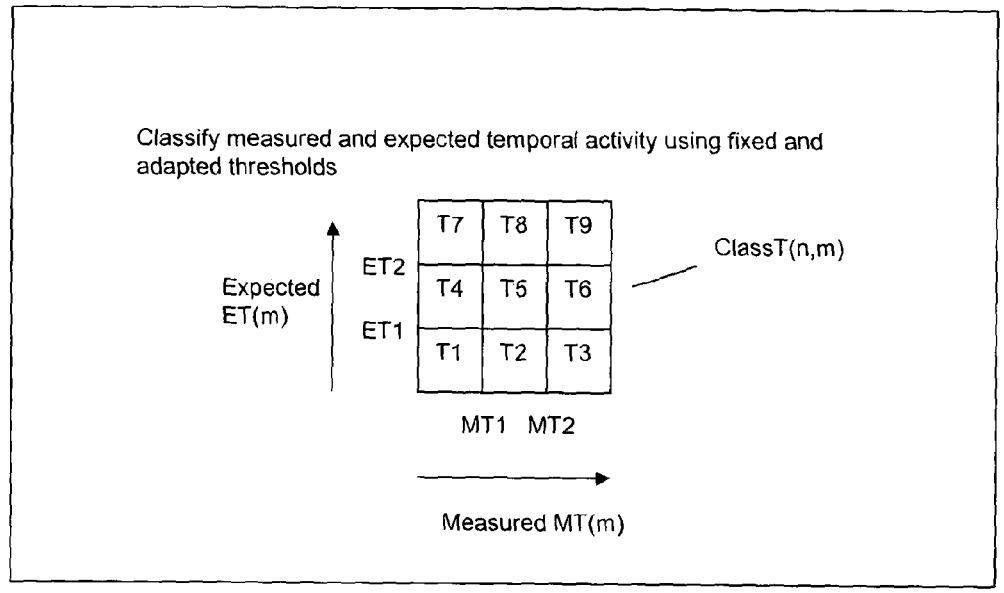
FIG. 6 is a 2-dimensional matrix for classifying temporal measures.

Equation (15) results in temporal class ClassT(n,m)= 1->9, and correspond to classes T1 to T9 shown in FIG. 6. Class T0 is reserved for macroblocks that have not been lost or recovered, as indicated by the loss map (see equation 1). FIG. 6 illustrates the classification process as a 2-dimensional table. The classification table can be interpreted to provide visibility weighting values to each macroblock class, ClassT(n,m), to aid the visibility pooling calculation. Pooling is performed on each error event (spatio-temporal region of lost and recovered macroblocks) to determine an overall visibility rating.

Spatial Analysis and Classification

Spatial analysis is used to model the expected spatial variation of the pixel properties for each macroblock in step 210. This is done by modelling the expected spatial Variation of equation (2), with the aim of identifying unusual and visible variations occurring at known packet loss error locations.

A spatial difference measure ms(n,m) for macroblock m of frame n may be defined according to equation (16).

$$ms(n,m,i)=NRP(n,m)-NRP(n,i) m \in M(n) n \in N \quad (16)$$

In (16), variable i identifies a macroblock within frame n belonging to the same spatial analysis region as m. Typically, this would be a neighbouring macroblock.

This spatial difference measure may then be used as the basis of a regional spatial analysis, determining a measure MS(n,m) for macroblock m of frame n according to (17).

$$MS(n,m)=f_{SW1}(ms(n,m,i)) i \in WS1(n,m) m \in M(n) n \in N \quad (17)$$

WS1(n,m) defines the set of macroblocks over which the regional measure is to be calculated for target macroblock m in frame n and would typically be neighbouring macroblocks within the same frame.

$f_{SW1}$ represents a function operating on the set of ms(n, m,i) results for macroblocks i from set WS1( ). An averaging function can then be implemented according to (18).

$$MS(n, m) = \frac{1}{nWS1} \sum_{i \in WS1(n,m)} ms(n, m, i) \quad m \in M(n) \; n \in N \quad (18)$$

In equation (18), nWS1 represents the total number of macroblock entries in set WS1( ).

Thus, MS(n,m) represents a measure of spatial variation between a given macroblock and its neighbours. This measure may be used to estimate the visibility of lost or recovered macroblocks by comparing it with an expected value calculated from previous frames. Analysis of the spatial difference measure MS(n,m) over preceding frames may be performed using (19) to determine an expected spatial measure ES(n,m), $$ES(n,m)=f_{SW2}(MS(\ )WS2(n,m)) m \in M(n) n \in N \quad (19)$$

Where MS( ) is the spatial difference function to be applied to macroblocks defined by WS2(n,m). Thus, in equation (19), $f_{SW2}(\ )$ represents a function operating on the measures MS( ) calculated from set of macroblocks defined by a sliding window WS2(n,m).

WS2(n,m) for a linear 5-frame window is given by equation (20), but this window need not be spatially restricted to the single macroblock position m.

$$WS2(n,m)=\{(n-1,m),(n-2,m),(n-3,m),(n-4,m),(n-5,m)\} \quad (20)$$

Thus, an expected spatial measure averaged over the window WS2( ) may be calculated as $ES_{ave}$(n,m) according to equation (21).

$$ES_{ave}(n, m) = \frac{1}{nWS2} \sum_{(nw,mw) \in WS2(n,m)} ES(nw, mw) \quad m \in M(n) \quad n \in N \quad (21)$$

In equation (21), nWS2 represents the number of macroblocks in the window WS2( ).

The windowed spatial difference measure is thus calculated for each macroblock in each frame, and the results stored in memory 108.

The windowed spatial difference measure ES(n,m) represents an analysis of the variation of MS( ) in a spatio-temporal window preceding macroblock (n,m) and can be used to represent an expected value of MS(n,m). The visual impact of a lost macroblock may then be estimated by comparing the actual and expected spatial difference measures for the lost macroblock. The advantage of using expected values in this process allows decisions to be made on thresholds that adapt to the time-varying properties of the video content and therefore, reflect local masking properties.

Equation (1) earlier describes a macroblock loss map. The visual impact of a lost or recovered macroblock can be estimated using the macroblock loss map defined by equation (1) to target analysis of the expected and measured spatial difference measures, ES( ) and MS( ) using equation (22) below.

$$ClassS(n,m)=fSclass(L(n,m),MS(n,m),ES(n,m)) m \in M(n) n \in N \quad (22)$$

In equation (22), fSclass( )=S0 for L(n,m)=0, where class S0 indicates a valid macroblock, not to be considered in packet loss visibility. Thus, the method preferably only performs classification for macroblocks that have suffered loss. This process is illustrated in FIG. 5, with the fSclass( ) function represented by the spatial classification block 512.

The spatial classification process analyses measured and expected values of lost macroblocks to identify the presence of a large difference between expected and measured parameters. This may be implemented on a per-macroblock basis in the form of a simple 2-threshold 3-class technique according to equation (23).

$$ClassMS(n, m) = 0 \quad MS(n, m) < MS1(m, n) \quad (23)$$
$$= 1 \quad MS1(n, m) <= MS(n, m) < MS2(n, m)$$
$$= 2 \quad MS2(n, m) <= MS(n, m) \quad m \in M(n) \quad n \in N$$

In equation (23), MS1(n,m) and MS2(n,m) are adaptive thresholds determined for each macroblock being analysed and are based on the corresponding expected spatial difference values for that macroblock. Class 0 is intended to represent a measured value MS(n,m) significantly lower than expected, class 1 within an expected range, and class 2 significantly higher than expected, with thresholds MS1(n,m) and MS2(n,m) set accordingly. MS1( ) and MS2( ) might be weighted versions of functions such as the average spatial measure (21) or similar statistical function based on the windowed macroblocks such as maximum and minimum as set out in equations (24) and (25) below.

$$MS1(n, m) = \min_{(nw,mw) \in WS2(n,m)} (MS(nw, mw)) \quad m \in M(n) \quad n \in N \quad (24)$$

$$MS2(n, m) = \max_{(nw,mw) \in WS2(n,m)} (MS(nw, mw)) \quad m \in M(n) \quad n \in N \quad (25)$$

The possible visible impact of the classification from equation (23) may be quantified by also considering the magnitude of the expected measure ES( ) according to equation (26).

$$ClassES(n, m) = 0 \quad ES(n, m) < ES1 \quad (26)$$
$$= 1 \quad ES1 <= ES(n, m) < ES2$$
$$= 2 \quad ES2 <= ES(n, m) \quad m \in M(n) \quad n \in N$$

In equation (26), ES1 and ES2 are fixed thresholds. Class 0 is intended to represent an expected value ES(n,m) for low spatial differences and class 2 for high spatial differences and ES1 and ES2 are set accordingly.

Classification resulting from (23) and (26) may be combined into a 2-dimensional class table according to equation (27).

$$ClassS(n,m)=ClassES(n,m)*3+ClassMS(n,m)+1 \quad (27)$$

Figure 7:
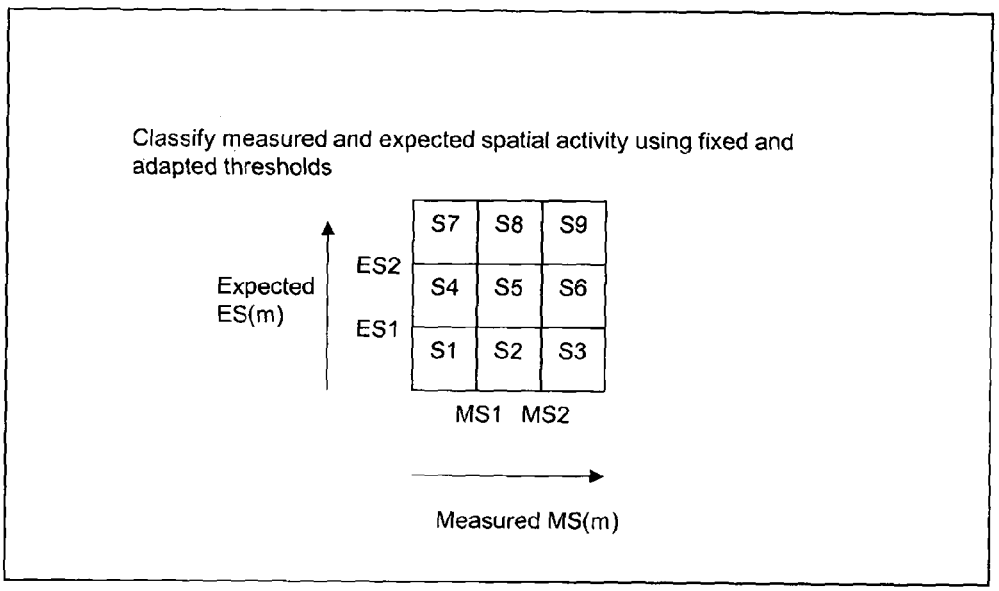
FIG. 7 is a 2-dimensional matrix for classifying spatial measures.

Equation (27) results in output spatial class ClassS(n,m) ranging from 1 to 9, and correspond to classes S1 to S9 in FIG. 7. Class S0 is reserved for macroblocks that have not been lost or recovered, as indicated by the loss map (see equation 1). FIG. 7 illustrates the 2-dimensional classification process. The classification table can be interpreted to provide visibility weighting values to each macroblock class, ClassS(n,m), to aid the visibility pooling calculation. Pooling is performed for each error event (spatio-temporal region of lost and recovered macroblocks) to determine an overall visibility rating.

Exemplary embodiments of the invention are realised, at least in part, by executable computer program code which may be embodied in application program data provided for by the program modules 106 at the receiver 100. When such computer program code is loaded into the memory 108 of the receiver 100 for execution by the processor 104, it provides a computer program code structure which is capable of performing at least part of the methods in accordance with the above described exemplary embodiments of the invention.

Furthermore, a person skilled in the art will appreciate that the computer program structure referred to can correspond to the process flow charts shown in FIG. 2 where each step of the flow charts can correspond to at least one line of computer program code and that such, in combination with the processor 104, provides apparatus for effecting the described process.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of determining error visibility resulting from packet loss in a video sequence, said video sequence comprising a plurality of frames, each frame comprising a plurality of blocks, said method comprising:
   (i) identifying a block affected by packet loss in one of the plurality of frames, wherein the frame containing the identified block is the current frame;
   (ii) determining an expected temporal measure associated with the identified block based on a temporal difference of the area associated with the identified block across a plurality of the preceding frames;
   (iii) determining an expected spatial measure associated with the identified block based on a spatial difference between the identified block and one or more blocks neighbouring the identified block, the spatial difference considered over a plurality of preceding frames;
   (iv) comparing the determined expected temporal measure with the actual temporal measure for the identified block, wherein the actual temporal measure is based on a temporal difference of the area associated with the identified block in the current and at least, one preceding frame;
   (v) comparing the determined expected spatial measure with the actual spatial measure for the identified block, wherein the actual spatial measure is based on a spatial difference between the identified block and one or more blocks neighbouring the identified block in the current frame;
   (vi) determining a measure of error visibility of the identified block based on the said comparisons; and
   (vii) providing a video output, though an video output interface, based on the determined measure of error visibility.

2. A method according to claim 1, wherein the comparing step (iv) further comprises setting one or more temporal thresholds based on the determined expected temporal measure, wherein the one or more temporal threshold is used in the comparison with the actual temporal measure.

3. A method according to claim 1, wherein the comparing step (v) further comprises setting one or more spatial thresholds based on the determined expected spatial measure, wherein the one or more spatial threshold is used in the comparison with the actual spatial measure.

4. A method according to claim 1, wherein a block is a macroblock.

5. An information processing apparatus for determining error visibility resulting from packet loss in a video sequence, the apparatus comprising:
   a video input interface configured to receive a plurality of frames, each frame comprising a plurality of blocks;
   a memory configured to store instructions;
   a computer processor configured to execute the instructions to at least perform:
      (i) identifying a block affected by packet loss in one of the plurality of frames, wherein the frame containing the identified block is the current frame;
      (ii) determining an expected temporal measure associated with the identified block based on a temporal difference of the area associated with the identified block across a plurality of the preceding frames;
      (iii) determining an expected spatial measure associated with the identified block based on a spatial difference between the identified block and one or more blocks neighbouring the identified block, the spatial difference considered over a plurality of preceding frames;
      (iv) comparing the determined expected temporal measure with the actual temporal measure for the identified block, wherein the actual temporal measure is based on a temporal difference of the area associated with the identified block in the current and at least, one preceding frame;
      (v) comparing the determined expected spatial measure with the actual spatial measure for the identified block, wherein the actual spatial measure is based on a spatial difference between the identified block and one or more blocks neighbouring the identified block in the current frame; and
      (vi) determining a measure of error visibility of the identified block based on the said comparisons; and
   a video output interface for providing a video output based on the determined measure of error visibility.

6. The information processing apparatus according to claim 5, wherein the computer processor is further configured to execute the instructions to at least perform:
   setting one or more temporal thresholds based on the determined expected temporal measure, wherein the one or more temporal threshold is used in the comparison with the actual temporal measure.

7. The information processing apparatus according to claim 5, wherein the computer processor is further configured to execute the instructions to at least perform:
   setting one or more spatial thresholds based on the determined expected spatial measure, wherein the one or more spatial threshold is used in the comparison with the actual spatial measure.

8. The information processing apparatus according to claim 5, wherein a block is a macroblock.

9. The information processing apparatus according to claim 5, wherein the information processing apparatus is a set top box.

* * * * *